United States Patent [19]
Lederer

[11] 3,944,063
[45] Mar. 16, 1976

[54] CONTAINER ORIENTING DEVICE

[76] Inventor: George H. Lederer, 75 Gordon Road, Willowdale, Ontario, Canada

[22] Filed: Oct. 25, 1974

[21] Appl. No.: 518,099

[52] U.S. Cl. ............... 198/255; 198/266; 198/283
[51] Int. Cl.² ........................................ B65G 47/24
[58] Field of Search .......... 198/237, 254, 255, 266, 198/278, 279, 281, 283, 284, 287, 52, 190

[56] References Cited
UNITED STATES PATENTS

| | | |
|---|---|---|
| 2,383,270 | 8/1945 | Niederer et al.................... 198/52 X |
| 2,764,274 | 9/1956 | Griswold et al................. 198/190 X |
| 3,297,131 | 1/1967 | Pawlowski .......................... 198/287 |
| 3,567,006 | 3/1971 | Bell et al............................. 198/287 |

Primary Examiner—Evon C. Blunk
Assistant Examiner—Douglas D. Watts

[57] ABSTRACT

Containers which are wider than they are high are delivered to a pair of belts spaced to support the container below its widest upper edge. The containers are delivered to the belts by a chute which delivers the containers in one of two orientations either bottom leading or bottom trailing relative to the conveyor direction.

4 Claims, 4 Drawing Figures

CONTAINER ORIENTING DEVICE

This invention relates to the orienting of containers.

The type of container with which this invention is specifically concerned, is an open topped container which is a body of revolution about the intended vertical axis and has a closed bottom. (It is not relevant to the invention that the open top will usually be closed by a lid manufactured separately from the container). By 'intended vertical axis' is meant that the axis will be vertical when the bottom of the container is on a horizontal surface and the container open upwardly. The type of containers with which this invention is concerned are those whose largest diameter about the surface of revolution is at the upper edge. Most commonly such containers will terminate at their upper edge in a rim.

It has in the past been easy to orient containers whose depth was greater than the widest diameter. Because of the relative dimensions between the depth and the diameter, the container could readily be made to assume an orientation open upward with its rim supported on two diametrically opposed surfaces. Such techniques have not, however, been successful with containers wider than their height because the latter can easily slip between the diametrically opposed surfaces, become jammed or otherwise disoriented.

This invention provides a pair of belts each of which provides a flight for supporting the container below the rim or upper edge. The flights are parallel and spaced to support such a container on diametrically opposed rim locations (and to transport it from a loading to a disposal area) in what is called the 'travel direction'. A chute is provided for directing the containers downward toward the spaced flights so that the possible container orientations are limited to two. These two orientations comprise having the container in the chute with its bottom trailing or leading while the chute is oriented to direct the containers so the plane of the rim or upper edge portion intersects the belt flights along a line sufficiently close to the perpendicular to the travel direction that the flights will halt the downward travel of the container. The chute is sloped to direct the container so that the plane of the rim or upper edge ranges from the vertical to sloping downwardly and rearwardly. The chute is further arranged to direct the containers so that the downwardly leading edge of the container passes between the belt flights until the flights stop the downward motion by contacting the spaced portions of the rim. The chute is designed so that the orientation of the container at the time of such contact is either bottom leading (relative to the travel direction) with the slope such that the container centre of gravity forward of the line of contact of the container with the flights so that the container will tend to swing in one direction to an upright position, with its rim or widest diameter resting on the flights, or bottom trailing with the aforementioned slope also such that the container centre of gravity is rearward of the line of contact of the container with the flights, so that the container will tend to swing in the other direction to the same upright position with its rim or widest diameter resting at diametrically opposed locations on the flights.

Other moments than that due to gravity affect the rotation of the container leaving the chute and impinging upon the belt, and must be taken into account. A moment acting in the same direction as the gravity is that caused by the kinetic energy of the falling container, which may be considered as involving a force acting through the centre of gravity about the points of contact of the container with the belt. The friction of the belt acting on the container at the points of contact supplies a moment about the centre of gravity which in the case of a bottom trailing container will augment the other moments and in the case of a bottom leading container will oppose the other moments except with an extremely flat chute slope where the centre of gravity of the container is below the belt level when contact is made therewith. Thus the slope of the chute should always be selected having these moments in mind and so that, on the one hand they cause rotation of the container in the desired direction but on the other hand, they do not cause such desired rotation with such force that the container tends to rotate too far past its desired final orientation. The chute angle, within the range discussed, may be selected to achieve the desired results and the desired orientation of the container. The containers, as a result, all similarly oriented are carried away on the parallel flights. The chute must be designed so that when a container strikes the flight, it is free to swing in the desired direction while commencing its travel along the flights.

By limiting the angle of approach of the containers down the chute to the parallel flights and the possible orientations of the containers to two opposite arrangements (in each of which the widest portions of the containers contact the opposed flights), means and a method are provided so that the containers may be consistently correctly oriented on the travelling flights. They are carried thereby to a suitable location for further operations. It will be realized that it is relatively easy to provide the containers in a chute in one of two opposite orientations, as required by the apparatus of the invention.

It will be noted that the requirement that the chute orient the containers so that their widest portion is sure to strike both flights, avoids the risk of the containers falling between the flights, the height being less than the diameter. This problem is not faced by others handling containers whose height is larger than their maximum diameter.

In a preferred form of the invention, the risk of misorientation through rotation force when the containers strike the flights after passing down the chute, is lessened by providing a surface below the flights just below the level defined by the bottom of a container correctly oriented on the flights. Such surface is sometimes contacted by bottom edges of the containers during their perambulations into correct position and tends to dampen the movements of the container.

In drawings which illustrate a preferred embodiment of the invention:

Figure 2:
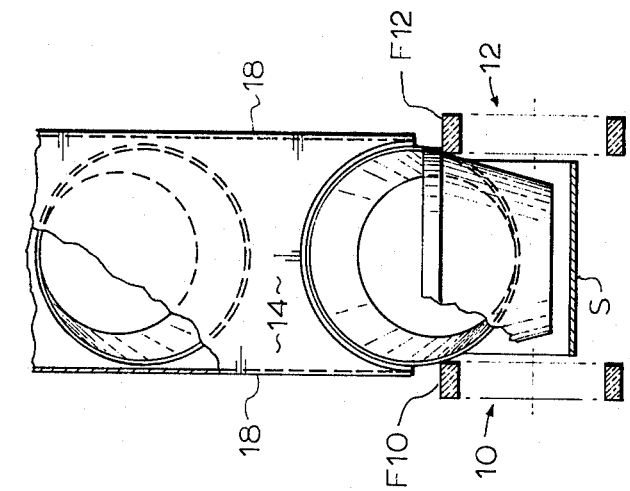
FIG. 2 shows a cross section along the lines 2 — 2 of FIG. 1.
Figure 1:
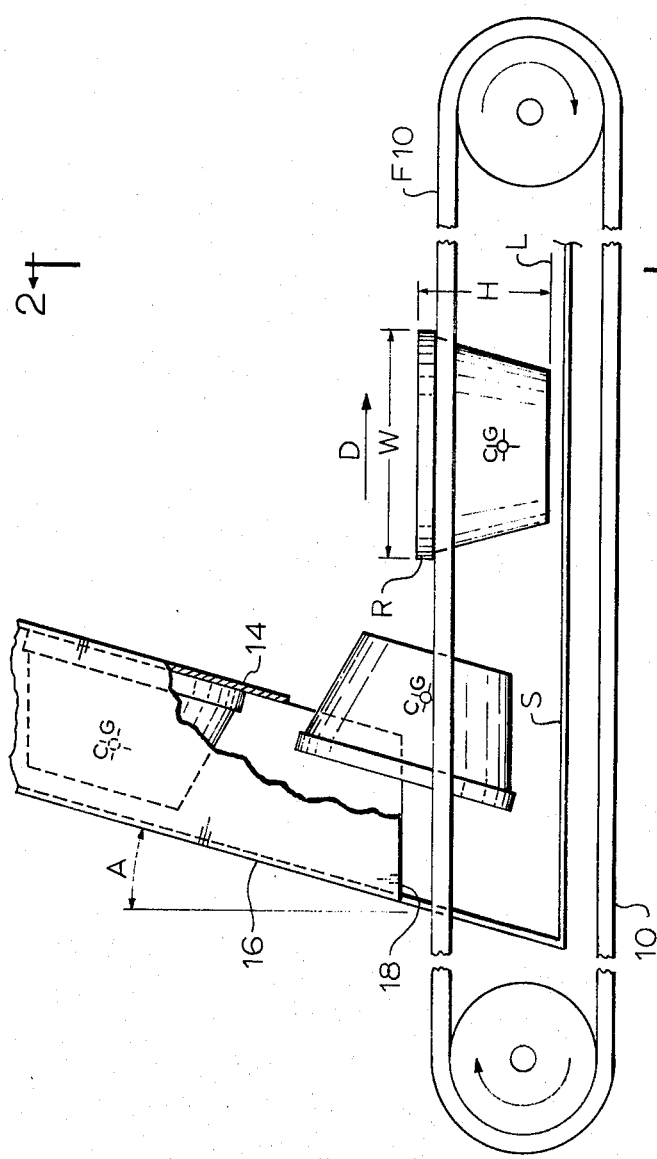
FIG. 1 shows a side view of a belt flight and a chute, in accord with the invention.

In FIGS. 1 and 2 a pair of belts 10 and 12 are arranged so that their upper flights F10 and F12 are parallel, driven in the desired travel direction D for the container, and spaced to support a container, such as one of those shown, on diametrically opposed portions of the rim.

The container, as previously described, is of the type designed to be closed at the bottom, open at the top and a forming body of revolution about its intended axis, with the height H shorter than the widest diameter W. Although the container shown herein has a clearly defined rim R, this is not a criteria for the containers with which this invention is concerned, the criteria being that the widest diameter of the container be at the rim or upper edge.

A chute comprising front 14 back wall 16 and side walls 18 is dimensioned so that the containers may only travel theredown in one of two orientations, i.e. bottom leading or bottom trailing relative to direction D and so that the plane of the container's widest diameter intersects the opposite flights along a line sufficiently close to the perpendicular to direction D that the container cannot pass between the opposed flights, but its widest portion must be intercepted by them.

The chute, as previously described, must deliver the containers with the planes of their widest diameter portions between the vertical and the downward rearward orientation where the centre of gravity of a bottom trailing container would be rearward of the line of contact of the rims with the flights. Forward wall 14 terminates at its forward lower edge, high enough to allow exit of a container travelling along the flights while still standing edgewise.

FIGS. 1 and 2 show a container at rest and travelling along the flights and it will be noted that the bottom of the container defines a level L. Just below this level there is provided a surface S between the belt flights. The purpose of the Surface S is to dampen movement of a container which due to its travel down the chute tends to bounce or oscillate on the flights.

Figure 3:
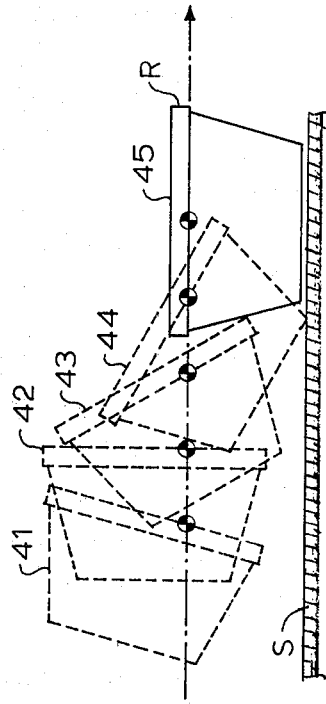
FIG. 3 shows a schematic of the movement of the bottom leading container from the chute orientation to a position of rest on the flights.
Figure 4:
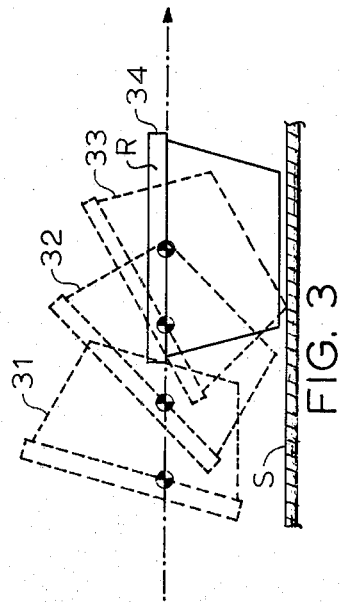
FIG. 4 shows a schematic of the movement of a bottom trailing container from the chute orientation to a position of rest on the flights.

FIG. 3 shows a bottom leading container from its chute orientation 31 through positions 32, 33 and rest position 34. The quartered circle shows for each position the line of contact of the container with the flights. As illustrated in position 33 the container has struck the lower surface S dampening its movements. As illustrated in FIG. 4 showing the perambulations of a bottom trailing container having chute orientation 41 through positions 42, 43, 44 and 45 the rest position. In positions 44 the surface S has damped movement of the container 44 as it moves toward position 45. Perambulations of the container as shown in FIG. 3 or in FIG. 4 may include the container orienting from position 33 past the rest position 34 and returning thereto or orienting from position 44 past position 45 and returning thereto.

I claim:

1. Method of orienting open ended containers which are a surface of revolution about the intended vertical axis thereof, said containers being shaped so that their largest diameter is located at the open end, and so shaped that their maximum vertical dimension is less than said largest diameter, comprising the steps of:
    providing a pair of belts each of which is arranged to provide a flight to partly support such a container below said largest diameter,
    said flights being arranged to be parallel, directed in the same travel direction and spaced to support diametrically opposed portions of said largest diameter,
    causing said belts to operate so that each of said flights move in the travel direction,
    delivering such containers downwardly toward said belt flights, in one of two orientations, i.e. with the bottom of the container leading or trailing in the direction of belt travel so that the downwardly leading surface of the largest diameter of a container will pass between said belt flights and then contact both said flights,
    the angle of delivery of such containers being selected with a range so that the plane of the portion of largest diameter intersects said flights along a line approximately perpendicular to the travel direction and the slope of such planes is from the vertical to directions downward and rearward relative to the travel direction.

2. Method of orienting open ended containers surrounded by a rim which are a surface of revolution about the vertical axis thereof, whose rim is the largest diameter about said axis and whose vertical dimension is less than the diameter of said rim and whose centre of gravity is displaced from said rim, comprising the steps of:
    providing a pair of belts each of which is arranged to provide a flight to support the rim of such a container,
    said flights being arranged to be parallel, designed to be moved by said belts in the same travel direction and spaced to support diametrically opposed portions of said rim,
    causing said belts to operate so that said flights move in the travel direction,
    delivering such containers downwardly toward said belt flights, in one of two orientations, i.e. with the bottom of the container leading or trailing in the direction of belt travel, so that the outer surface of said rim will pass between said belt flights and then be halted by the flights at opposed points of contact,
    the angle of delivery of said containers being selected within a range, so that the planes of the portion of largest diameter intersect said flights along a line approximately perpendicular to the travel direction and the slope of such planes is from the vertical to directions downward and rearward relative to the travel direction.

3. Method as claimed in claim 1 including the step of preventing portions of containers impinging upon the belt flights from extending substantially further below the top of the belt flights than the level defined by the bottom surface of the container when the container is stationary on said belt with the rim resting on said belt flights.

4. Method as claimed in claim 2 including the step of preventing portions of containers impinging upon the belt flights from extending further below the top of the belt flights than the level defined by the bottom surface of the container when the container is stationary on said belt with the rim resting on said belt flights.

* * * * *